United States Patent [19]

Bruun

[11] Patent Number: 5,155,991
[45] Date of Patent: Oct. 20, 1992

[54] BLEED AIR FLOW REGULATORS WITH FLOW BALANCE

[75] Inventor: Eugene R. Bruun, Simsbury, Conn.

[73] Assignee: United Technologies Corporation, Hartford, Conn.

[21] Appl. No.: 678,501

[22] Filed: Apr. 1, 1991

[51] Int. Cl.⁵ .............................................. F02C 6/00
[52] U.S. Cl. ................................. 60/39.07; 60/39.15; 454/74
[58] Field of Search ................. 60/39.07, 39.15, 39.29; 137/606; 454/71, 72, 74, 76

[56] References Cited

U.S. PATENT DOCUMENTS

| | | | |
|---|---|---|---|
| 3,177,679 | 4/1965 | Quick et al. | 454/71 |
| 4,300,587 | 11/1981 | Daeschner | 137/117 |
| 4,506,594 | 3/1985 | Rowland et al. | 454/74 |
| 4,779,644 | 10/1988 | Benson | 137/606 |

Primary Examiner—Louis J. Casaregola
Attorney, Agent, or Firm—Patrick J. O'Shea

[57] ABSTRACT

Bleed air flow from each engine of a multi-engine gas turbine powered aircraft is determined by using venturi flow probe sensors (50,100) which each include a venturi (52,102). The pressure differential associated with the pressure within the throat of the venturis (52,102) and the pressure immediately upstream of the venturi is partially indicative of the bleed air flow associated with the respective engine. The appropriate sensed pressure and temperature values are provided to a controller (18) which calculates the bleed air flow from each engine. The controller (18) also calculates a trim signal (224) which is used to partially control the position of pressure regulating valves (14,64) in order to substantially equalize the flow of bleed air from each of the gas turbine engines.

8 Claims, 3 Drawing Sheets

BLEED AIR FLOW REGULATORS WITH FLOW BALANCE

TECHNICAL FIELD

This invention relates to bleed air systems for multi-engine gas turbine powered aircraft, and more particularly to such systems which regulate the amount to air bleed to achieve a near equal amount of bled air flow from each engine.

BACKGROUND

In most commercial and military aircraft, air is bled by a bleed air system from two or more of the aircraft's gas turbine engines to supply pneumatic and thermal power to a number of aircraft and engine systems; for example: an air conditioning system, a cabin pressurization system, a thermal anti-ice (TAI) system, and a thrust reverser system.

In conventional bleed air systems, each engine supplies bleed air to a common manifold. Air flow from each engine to the manifold is controlled by the bleed air system to provide compressed air of a certain pressure and temperature. To ensure that each of the engines is supplying near equal air flows into the manifold, flow balancing is typically employed.

U.S. Pat. No. 4,671,318 entitled, "Aircraft Engine Bleed Air Flow Balancing Technique" to Benson discloses a balanced flow bleed air control system, and thoroughly describes the problems associated with unequal bleed air flows. The '318 patent teaches sensing the pressure drops across the heat exchangers (i.e., the precoolers) associated with each of the engines, and using that information to adjust the area of each pressure regulating valve (PRV). However, the variation in the pressure drop across each heat exchanger resulting from contamination during use, manufacturing tolerances and other error sources, precludes this approach from meeting the flow sharing accuracy requirements for the latest generation of bleed air systems. That is, the mass flow of bleed air from each engine cannot be calculated to within the accuracies required to sufficiently balance the bleed air flows due to the errors associated with sensing the pressure drop across the heat exchangers.

DISCLOSURE OF THE INVENTION

An object of the present invention is to provide an apparatus for balancing the flow of bleed air being extracted from each of a plurality of gas turbine engines.

Another object of the present invention is to accurately compute the flow of compressed air extracted from each gas turbine engine into its bleed air system, by using a venturi flow probe disposed in a conduit through which the compressed air flows to sense the pressure in the throat of a venturi through which a portion of the compressed air flows, and by sensing the pressure in the conduit external to the venturi and providing a signal indicative of the difference between these two sensed pressures, which can be used to calculate the flow of compressed air.

Yet another object of the present invention is to increase the accuracy of balancing bleed air flows from a plurality of gas turbine engines into a common conduit in order to achieve near equal bleed air flows from each of the plurality of gas turbine engines.

According to the present invention, the flow of bleed air from two or more gas turbine engines is controlled in order to substantially equalize the bleed air flow from each engine by computing the flow of bleed air from each engine and trimming the flow of bleed from each engine in order to substantially equalize the flow of bleed air. The bleed air flow is calculated by sensing the pressure drop which occurs in a venturi located within a conduit through which the bleed air from the associated engine flows, as well as sensing the pressure and temperature in the conduit, and providing signals indicative thereof to a controller which calculates the bleed air flow from each engine and compares the calculated flows to determine the degree of flow imbalance, if any, that exists. In the event flow imbalance does exist, each bleed air flow is trimmed in order to substantially equalize each bleed air flow.

An advantage of the present invention is, using accurately computed bleed air flow measurements, and trimming the bleed air flow extracted from each engine based on these accurately computed measurements, allows the bleed air flows to be substantially equalized thereby decreasing fuel consumption and operating wear on each engine.

These and other objects, features and advantages of the present invention will become more apparent in light of the following detailed description of an exemplary embodiment thereof as illustrated in the accompanying drawings.

BEST MODE FOR CARRYING OUT THE INVENTION

Figure 1:
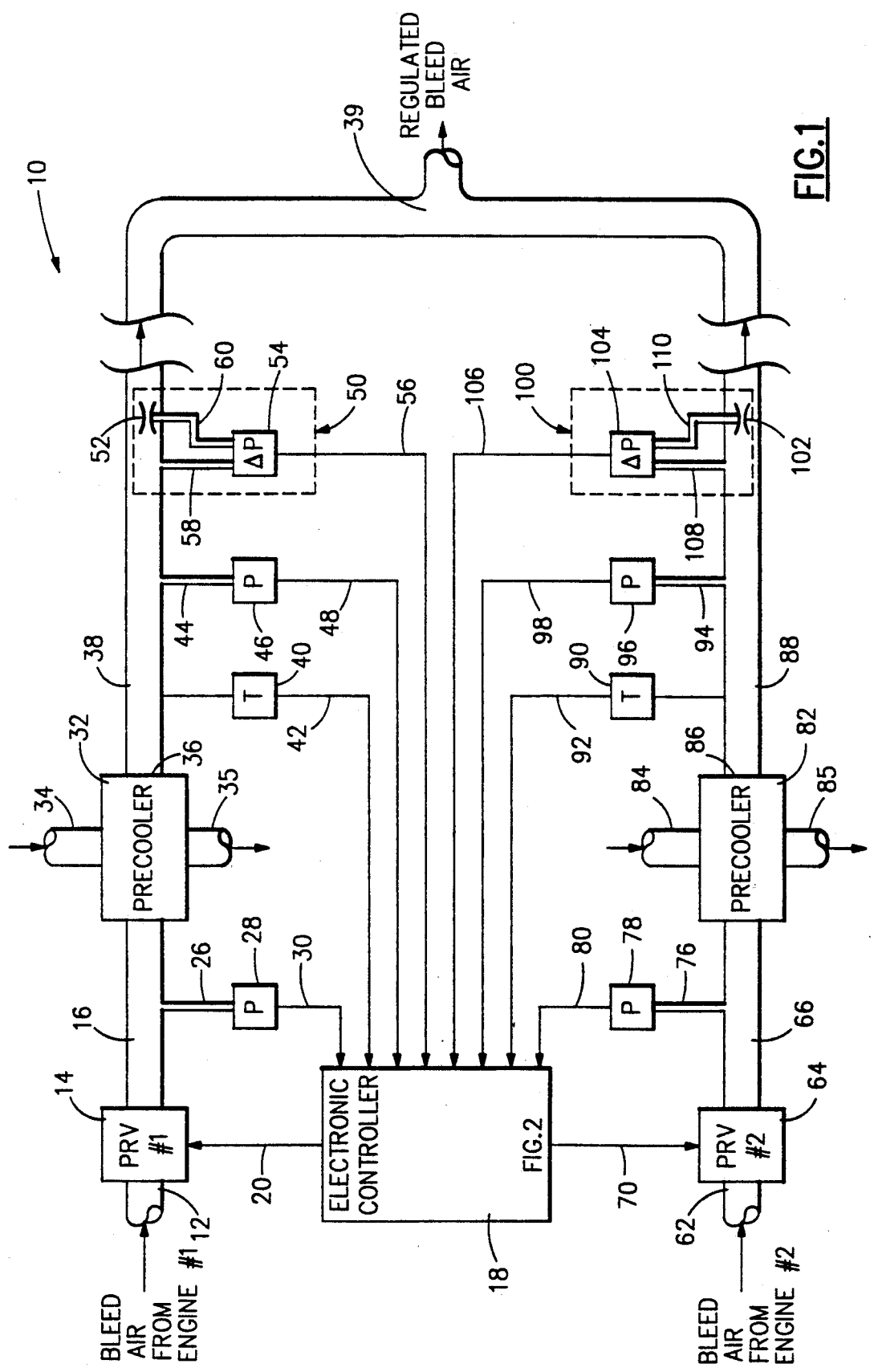
FIG. 1 is a block diagram illustration of a system for balancing the bleed air extracted from two gas turbine engines.

In FIG. 1 is illustrated a two engine bleed air system 10 for balancing bleed air flows in an aircraft (not shown) having two gas turbine engines (not shown). Note: since the components illustrated in FIG. 1 are identical for both engines, only one side shall be explained while using the numeral references for each side.

Warm compressed bleed air produced by two gas turbine engines (not shown) is routed by inlet conduits 12,62 to pressure regulating valves (PRV) 14,64 respectively. Each PRV 14,64 regulates the bleed air pressure in an associated PRV outlet conduit 16,66. The flow area within each PRV is modulated (i.e., regulated) by an electronic controller 18 via command signals on lines 20,70 respectively. The value of each command signal is determined primarily in response to the pressure sensed in the associated PRV outlet conduit 16,66.

Static pressure in the PRV outlet conduits 16,66 is sensed via nonflowing conduits 26,76 respectively by pressure sensors 28,78. The pressure sensors 28,78, provide pressure signals on lines 30,80 respectively to the controller indicative of the air pressure in their associated PRV outlet conduit 16,66. The nonflowing conduits 26,76 are tapped into the PRV outlet conduits 16,66 respectively, and during steady state no flow occurs in the nonflowing conduits and pressure in the nonflowing conduits is equal to the pressure in the associated PRV outlet conduit 16,66. The controller 18 modulates the flow area of each PRV 14,64 thereby selectively increasing or decreasing the mass of bleed air passing through each PRV in order to achieve a certain pressure in the PRV outlet conduits 16,66.

Bleed air in each PRV outlet conduit 16,66 flows into an associated precooler 32,82 where it is cooled in a manner well known within the art by cool air received from an associated cooling inlet conduit 34,84. The temperature of the bleed air exiting each precooler 32,82 through precooler outlets 36,86 respectively into precooler outlet conduits 38,88 is controlled by the electronic controller 18. The controller regulates the amount of cool air entering each cooling inlet conduit 34,84 by modulating a valve (not shown) upstream of each cooling inlet conduit 34,84. The cool air is circulated through its associated precooler 32,82 to extract heat from the bleed air and then the cool air is output via a conduit 35,85. The cooled bleed air flows from the precooler outlet conduits 38,88 are input to a common conduit 39.

Temperature sensors 40,90 sense the temperature of the bleed air flowing through the precooler outlet conduits 38,88 respectively, and provide signals indicative thereof to the controller 18 on lines 42,92. Static pressure of the bleed air in the precooler outlet conduits is sensed via nonflowing conduits 44,94 by pressure sensors 46,96 which provide a pressure signal indicative thereof on lines 48,98 respectively.

Operatively associated with each precooler outlet conduit 38,88, is one of two venturi flow probes 50,100 each comprising two main components: a venturi 52,102 and a delta P pressure sensor 54,104. The delta P pressure sensors 54,104 provide the electronic controller 18 with signals on lines 56,106 respectively. Each signal is indicative of the pressure differential between a first pressure sensed upstream of its associated venturi 52,102 and a second pressure which is sensed in the throat of its associated venturi. These two pressures are provided to each delta P pressure sensor 54,104 via a first nonflowing conduit 58,108 and a second nonflowing conduit 60,110 respectively. In carrying out the present invention it should be understood the first nonflowing conduits 58,108 may be placed downstream of the venturi rather than upstream.

As flow increases through the precooler outlet conduits 38,88, total pressure immediately upstream of each venturi and the total pressure in the throat of each venturi will remain the same. However, due to the venturi throat restriction, velocity of flow through each venturi throat increases with respect to the velocity immediately upstream and immediately downstream of each venturi. This velocity increase reduces the pressure in each venturi throat. When no flow is moving through the conduits 38,88 the pressure at the associated first and second nonflowing conduits remains the same.

Each venturi flow probe 50,100 in the present invention has several important advantages over other pressure/flow sensing alternatives. Most notable are their accuracy improvement over the conventional system design of sensing the pressure drop across the precooler. As an example, a recent study by the assignee compared the accuracy of the venturi flow probe design in the present invention against the conventional system design of sensing the pressure drop across the precooler. The study determined that during a sea level take-off condition at an ambient temperature of 58° F., the venturi flow probe yielded a flow calculation accuracy of ±4.5% of point, while the precooler delta P measurement yielded an accuracy of ±16.2% of point. Similarly, the study concluded that during a 39,000 foot aircraft cruise condition, the venturi flow probe yielded a flow calculation accuracy of ±6.0% of point, while the precooler delta P measurement yielded an accuracy of ±21.4% of point. Hence, during aircraft takeoff conditions, the present invention offers a 177% accuracy improvement with respect to the prior art, and during cruise over a 250% accuracy increase, with similar accuracy improvements at other operating conditions.

Figure 2:
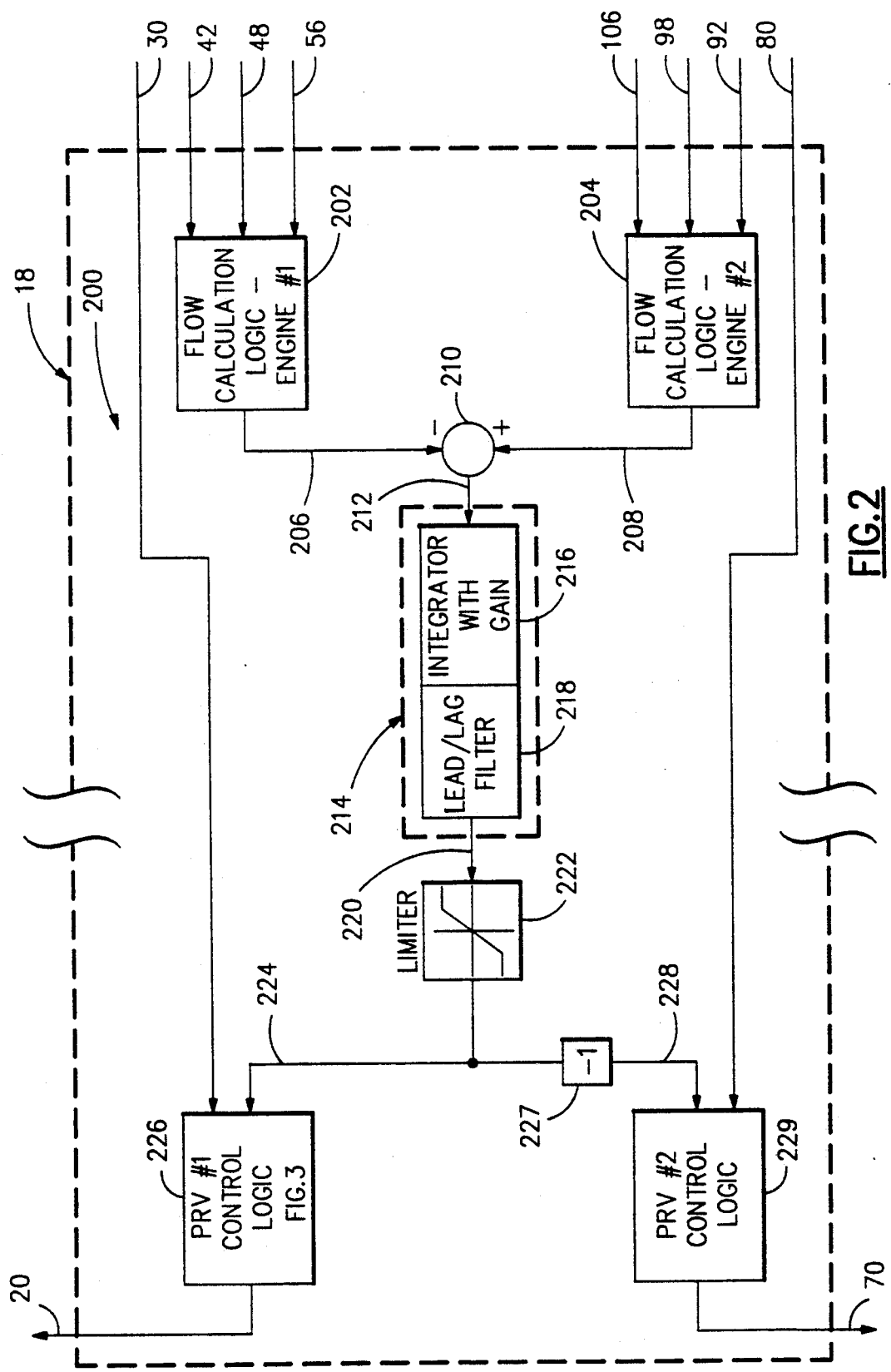
FIG. 2 is a block diagram illustration of control logic resident in a portion of the controller of FIG. 1 for balancing the flow of bleed air taken from each of the gas turbine engines.

In FIG. 2 is illustrated a block diagram of control logic 200 present in a portion of the electronic controller 18. The control logic 200 includes flow calculation logics 202,204 to compute the mass flow of bleed air from engine #1, and to compute the mass flow of bleed air from engine #2 respectively. Bleed air mass flow $W_a$, is computed by the following equation:

$$W_a = [(K \cdot DP \cdot P)/T]^{\frac{1}{2}} \quad \text{(Eq. 1)}$$

where:
K = a constant,
DP = sensed delta P pressure,
P = pressure in the precooler outlet conduit, and
T = temperature.

It is to be noted that the exponent $\frac{1}{2}$ of Eq. 1 is empirically derived, and as such the exponent may vary about $\frac{1}{2}$ based upon factors such as flow velocity in the precooler outlet conduits 38,88. How to compute flow through a conduit is well known and as such Eq. 1 is but one method presented as an example of how flow can be computed, and it is not presented by way of limitation.

A first signal indicative of the mass flow bled from engine #1 is provided on a line 206, and a second signal indicative of the mass flow bled from engine #2 is provided on a line 208. These two signals on the lines 206,208 are input to a summer 210 which provides a difference signal on a line 212 to a compensator 214. The difference signal represents the difference between the mass flow of bleed air from engine #1 and engine #2.

The compensator 214 comprises an integrator 216 with gain and a lead/lag filter 218. Operation of the lead/lag 218 and the integrator 216 are both well known in the art. Integrator 216 and integrators introduced hereinafter all comprise internal limits to prevent integral windup (i.e., saturation).

The compensator 214 provides an output signal on a line 220 to a limiter 222. The limiter 222 prevents a trim signal on a line 224 from going above a predetermined maximum, and from going below a predetermined minimum. If the signal on the line 220 is outside the predetermined minimum or maximum, the trim signal on line 224 is constrained (i.e., clamped) to the minimum or maximum, which ever the signal on the line 220 is closer to.

The trim signal on the line 224 is input to PRV#1 control logic 226 and to a negative unity gain 227. The negative unity gain 227 provides a signal on a line 228 to PRV #2 control logic 229. Also input to the PRV control logics 226,229 are the pressure signals on lines 30,80 respectively.

The trim signal on the line 224 has a limited authority which is set by the predetermined minimum and maximum of the limiter 222. As an example, the amount of authority may be ±5 psi. Hence, for a particular steady state operating condition, if the trim signal on the line 224 is clamped (i.e., at ±5 psi) by the limiter 222 while the signal on the line 212 is non-zero, and of the same polarity as the trim signal, the control logic 200 will not be able to equally balance the flows since the trim signal has reached the limits of its authority. Conversely if the trim authority is too large (e.g., ±30 psi), it may be possible for one of the engines to deliver a substantial majority of the bleed air if an undetected failure occurs in either the measurement or the computation of the bleed air flow from either engine. Therefore, the authority given the flow balance logic has to be empirically analyzed to determine a reasonable authority for each engine/airframe application.

Figure 3:
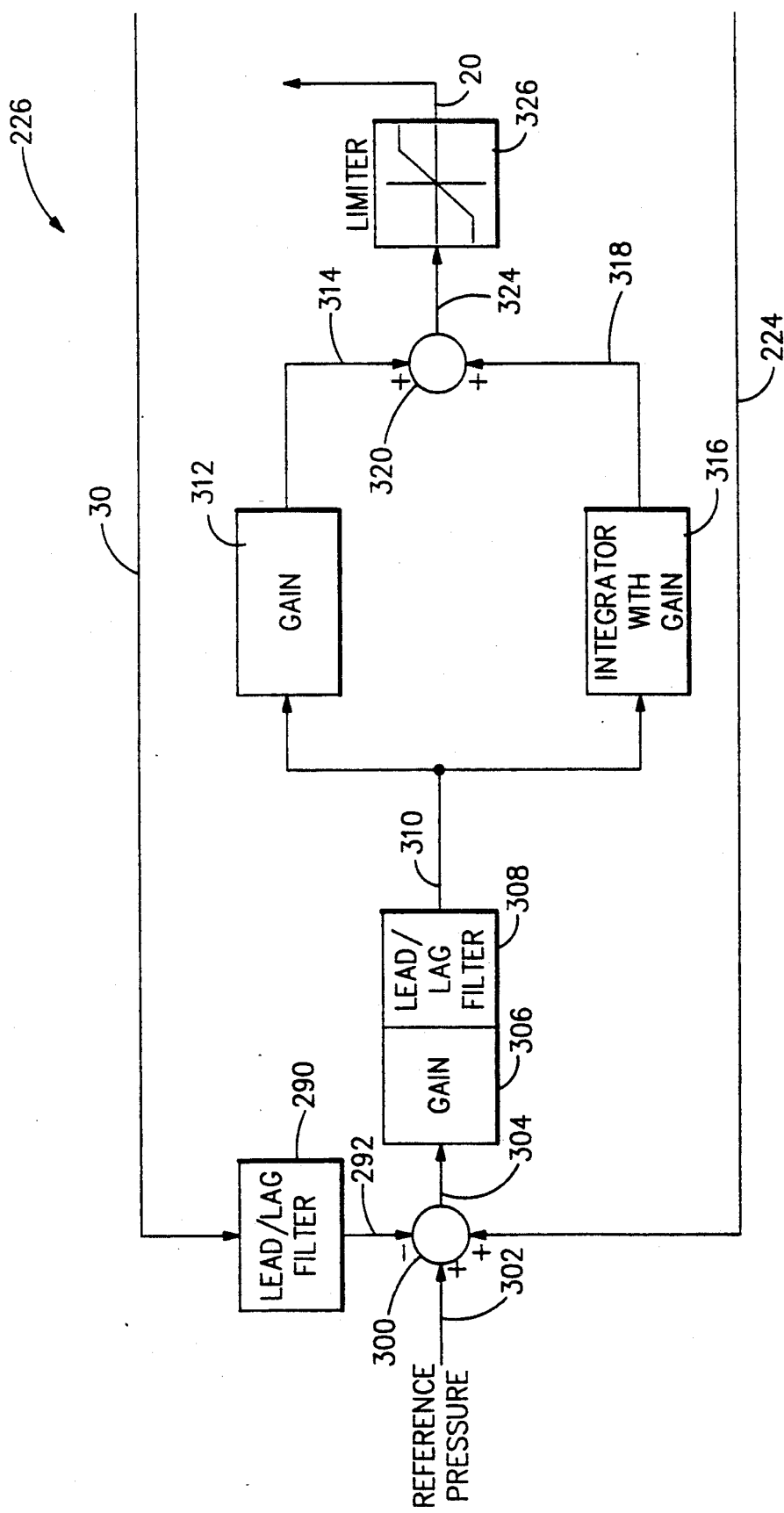
FIG. 3 is a detailed block diagram illustration of a portion of the control logic of FIG. 2 for controlling the pressure regulating valves illustrated in FIG. 1.

In FIG. 3 is illustrated the PRV#1 control logic 226. PRV#2 control logic 229 is identical in structure to the PRV#1 control logic 226 but with its own set of input and output signals. The pressure signal on the line 30 is input to a lead/lag filter 290 which provides a filtered signal on a line 292. The trim signal on the line 224 and the filtered signal on the line 292 are input to a summer 300 along with a pressure reference signal on a line 302. The summer 300 provides a signal on a line 304 to a gain 306, the resultant product of which is output to a lead/lag filter 308. The lead/lag 308 provides a filtered signal on a line 310 to two parallel paths.

The first path is a proportional path comprising a gain 312 which multiplies the signal on the line 310 and provides a signal indicative of the product on a line 314. The second path is an integral path comprising an integrator 316 with gain which provides a signal on a line 318. A summer 320 sums the signals on lines 314,318 and provides a signal on a line 324 to a limiter 326. The limiter 326 ensures the signal on the line 20 does not exceed a certain minimum or certain maximum (e.g., ±100 milliamps)

The system is best understood by an example of how the bleed air flows are substantially equalized by using the accurately sensed air flow information for flow balancing. Referring to FIGS. 1, 2 and 3, assume flow calculation logic 202 determines the air flow through line 38 is equal to 200 pounds per minute (ppm), and flow calculation logic 204 determines the air flow through line 88 equals 208 ppm. These two flow signals will be output on lines 206,208 respectively, setting the difference signal on the line 212 equal to 8 ppm. The 8 ppm difference is input to the compensator 214, increasing the trim signal on the line 224, assuming the limiter is not clamped. The trim signal is input to PRV#1 control logic 226. The trim signal will cause the signal on the line 304 to increase, and consequently an increase of the signal on the line 20 as long as the limits of the limiter 326 are not being exceeded. Hence the flow area of PRV #1 14 is increased to increase the airflow through the PRV outlet conduit 38.

PRV#2 control logic 229 will receive the negative of the trim signal on the line 224, resulting in the signal on the line 70 decreasing to reduce the PRV #2 64 flow area, thereby reducing flow through the PRV outlet conduit 88. Note: since there is an integrator 216 in the compensator 214, the error between the bleed air flows of engines 1 and 2 can be driven to 0 ppm (i.e., no steady state droop error).

Although herein described with respect to a two engine aircraft, it should be understood that the scope of this invention is not limited in application to a two engine aircraft. Rather it is anticipated that persons skilled in the art will readily use the bleed air control apparatus of the present invention in aircraft employing two or more gas turbine engines such as a three and four engine aircraft. In addition the PRVs used in this invention may be pneumatically controlled rather than the exemplary embodiment of the present invention disclosed herein using an electronic controller to modulate PRV area. For this alternate embodiment, the electronic controller may only send an area trim signal to each PRV. Also, upon inspection of FIG. 1 it is clear that the nonflowing conduits 44,94 may be removed since the pressure in the precooler outlet lines 38,88 may be presented to the pressure sensors 46,96 by the first nonflowing conduits 58,108.

In carrying out the present invention pressure sensors are provided to sense pressure in both the PRV outlet conduits 16,66 and the precooler outlet conduits 38,88. However, it should be understood that the pressure in the PRV outlet conduits is approximately equal to the pressure in the corresponding precooler outlet conduit 38,88 assuming negligible pressure losses. Therefore, the pressure sensors 28,78 may be removed and the information from pressure sensors 46,96 used instead. Similarly, pressure sensors 46,96 may be removed and the information from pressure sensors 28,78 used in their place.

While the venturi flow probe has been described as sensing the pressure upstream of the venturi, one skilled in the art will appreciate that the pressure in the conduit may also be sensed downstream of the venturi. The pressure should be sensed far enough downstream of the venturi outlet so that the venturi affect at that particular location in the conduit is negligible.

In addition it should be understood the control logic shown in FIGS. 2 and 3 is presented for illustration purposes and not by way of limitation. Numerous changes can be made to the logic based on the dynamics of the plant to be controlled and the response the system must provide. Therefore the logic may be adapted, just as any conventional control system design has to be adapted in view of the peculiarities of each application.

This invention has been shown and described with respect to an exemplary embodiment thereof, it should be understood by those skilled in the art that various other changes, omissions and additions to the form and detail thereof, may be made therein without departing from the spirit and scope of the invention.

I claim:

1. An apparatus for substantially equalizing the flow of bleed air extracted from a plurality of gas turbine engines for delivery to a common bleed air duct, comprising:
  a. a plurality of regulator means, each receiving engine bleed air from one of the plurality of engines, wherein each regulator means comprises,
    valve means, having a first inlet disposed to receive engine bleed air, having a first outlet, and having a variable flow area through which the engine bleed air flows, said valve means for controlling the air pressure at said first outlet by controlling the flow area that the bleed air flows through in response to a command signal, such that a pressure regulated flow of bleed air exits said first outlet;
    cooling means, for cooling said pressure regulated flow of bleed air, said cooling means having a second inlet disposed to receive said pressure regulated flow of bleed air exiting said first outlet, and having a second outlet through which cooled pressure regulated bleed air is discharged;

a conduit, having a third inlet disposed to receive the cooled pressure regulated bleed air from said second outlet, and extending therefrom to the common, bleed delivery duct;

a venturi, disposed within said conduit, having a throat through which at least a portion of the cooled pressure regulated bleed air passes;

first sensing means, for sensing the air pressure in said conduit, and for providing a first signal indicative thereof;

second sensing means, for sensing the air pressure in the throat of said venturi, and for providing a second signal indicative thereof; and third sensing means, for sensing the temperature of the cooled bleed air in said conduit, and for providing a temperature signal indicative thereof; and b. controller means, for receiving said first signal, said second signal, and said temperature signal, for computing as a function of said received signals the flow of cooled bleed air through said conduit in each of said plurality of regulator means, for comparing the computed flows, for generating a trim signal based on the comparison of the computed flows, and for providing to each of said valve means one of said plurality of command signals, each of said plurality of command signals is partially a function of said trim signal, such that the difference between the computed flows is driven towards zero thereby substantially equalizing the flow of the cooled bleed air from each of said plurality of regulator means into the common bleed air delivery duct.

2. The apparatus of claim 1, wherein:
each of said plurality of regulator means further comprises,
fourth sensing means, for sensing the air pressure at said first outlet, and for providing a fourth signal indicative thereof.

3. The apparatus of claim 1, wherein:
said controller means is also for computing the difference between the air pressure in said conduit and the air pressure in the throat of said venturi.

4. The apparatus of claim 1, wherein said trim signal value cannot go below a predetermined minimum and cannot go above a predetermined maximum.

5. The apparatus of claim 1, wherein said controller means further comprises:
an integrator, disposed to receive an input indicative of the difference of the computed flows of the cooled pressure regulated bleed air flows associated with said plurality of regulator means, said integrator providing an output signal which is indicative of said trim signal; and
means for limiting the magnitude of said output signal.

6. An apparatus for substantially equalizing the bleed air extracted from each of a plurality of gas turbine engines, comprising:
plurality of regulator means each of which is uniquely associated with one of the plurality of gas turbine engines, and each is disposed to receive the bleed air from its associated gas turbine engine, each of said plurality of regulator means for modulating the pressure of the bleed air by varying a flow area through which the bleed air flows, for modulating the temperature of the bleed air, and for providing a pressure and temperature regulated flow of bleed air;

plurality of conduits each disposed to receive said pressure and temperature regulated flow of bleed air from one of said plurality of regulator means;

plurality of venturis, each uniquely associated with and disposed within one of said plurality of conduits, in such a position that a portion of the associated said pressure and temperature regulated flow of bleed air flows through each of said plurality of venturis;

plurality of means each of which is for sensing the pressure within an associated one of said plurality of venturis, for sensing the pressure in said conduit, and for providing a delta signal indicative of the difference between the two pressures;

plurality of means each uniquely associated with one of said plurality of conduits, each for sensing the air temperature within the one of said plurality of conduits it is uniquely associated with, and for providing a temperature signal indicative thereof;

plurality of means each uniquely associated with one of said plurality of conduits, each for sensing the air pressure within the one of said plurality of conduits it is uniquely associated with, and for providing a pressure signal indicative thereof;

means for computing the mass flow rate of each of said plurality of pressure and temperature regulated flows of bleed air as a function of the regulated flow's associated said temperature signal, said pressure signal, and said delta signal, and for providing a plurality of computed signals each uniquely associated with and indicative of the mass flow rate of one of said plurality of pressure and temperature regulated flows of bleed air; and means for computing a trim signal based on said plurality of computed signals, such that the magnitude of said trim signal is indicative of the flow rate amount of each of said pressure and temperature regulated flows of bleed air has to change in order to substantially balance the flow of bleed air from each of the plurality of gas turbine engines.

7. The apparatus of claim 6, wherein each of said plurality of regulator means comprises:
a pressure regulating valve, disposed to receive the bleed air, and provide a pressure regulated flow of bleed air; and
a precooler, disposed to receive said pressure regulated flow of bleed air, and cool said pressure regulated flow of bleed air.

8. The apparatus of claim 6, wherein said means for computing a trim signal comprises:
means for computing a first signal indicative of the difference between said plurality of computed signals; and
an integrator, disposed to receive said first signal.

* * * * *